(12) United States Patent
Song

(10) Patent No.: US 10,688,891 B2
(45) Date of Patent: Jun. 23, 2020

(54) SEAT RECLINER FOR VEHICLE AND METHOD OF MANUFACTURING THE SAME

(71) Applicant: HYUNDAI DYMOS INCORPORATED, Seosan-si, Chungcheongnam-do (KR)

(72) Inventor: Woo Sool Song, Seoul (KR)

(73) Assignee: HYUNDAI DYMOS INCORPORATED, Seosan-si, Chungcheongnam-Do (KR)

( * ) Notice: Subject to any disclaimer, the term of this patent is extended or adjusted under 35 U.S.C. 154(b) by 0 days.

(21) Appl. No.: 16/204,682

(22) Filed: Nov. 29, 2018

(65) Prior Publication Data

US 2019/0193601 A1   Jun. 27, 2019

(30) Foreign Application Priority Data

Dec. 26, 2017   (KR) .......................... 10-2017-0180235

(51) Int. Cl.
*B60N 2/20*    (2006.01)
*B60N 2/22*    (2006.01)
(Continued)

(52) U.S. Cl.
CPC .......... *B60N 2/2255* (2013.01); *B60N 2/2251* (2013.01); *B60N 2/236* (2015.04); *B60N 2/2362* (2015.04)

(58) Field of Classification Search
CPC .... B60N 2/2251; B60N 2/2255; B60N 2/236; B60N 2/2362
(Continued)

(56) References Cited

U.S. PATENT DOCUMENTS

| 7,380,882 B2 * | 6/2008 | Oki ........................ B60N 2/236 297/367 R X |
| 7,416,255 B2 * | 8/2008 | Yamada ................. B60N 2/236 297/367 R |

(Continued)

FOREIGN PATENT DOCUMENTS

| KR | 10-2011-0133076 A | 12/2011 |
| KR | 10-1725412 B1 | 4/2017 |
| KR | 10-1747556 B1 | 6/2017 |

OTHER PUBLICATIONS

Korean Office Action dated Jan. 22, 2019 from the corresponding Korean Application No. 10-2017-0180235, 7 pp.

*Primary Examiner* — Rodney B White
(74) *Attorney, Agent, or Firm* — Brinks Gilson & Lione

(57) ABSTRACT

A seat recliner for a vehicle may include: a fixing flange provided with multiple guide parts spaced apart from each other and having a guide groove formed along a locus having a predetermined distance from a center axis; and a rotary cam mounted on a center portion of the fixing flange, rotating about the center axis to press a locking gear such that the locking gear slides along the guide parts. In particular, the rotary cam includes: a first protrusion formed on a mount surface of the rotary cam, which is coming into contact with the fixing flange when mounted; and a second protrusion formed on a surface opposite to the mount surface and capable of engaging with a control plate. When the first protrusion is inserted into the guide groove, the guide groove guides a rotation of the rotary cam.

9 Claims, 8 Drawing Sheets

(51) Int. Cl.
*B60N 2/225* (2006.01)
*B60N 2/235* (2006.01)

(58) Field of Classification Search
USPC .................. 297/366, 367 R, 367 P, 367 L
See application file for complete search history.

(56) References Cited

U.S. PATENT DOCUMENTS

| | | | | |
|---|---|---|---|---|
| 7,963,607 B2* | 6/2011 | Heo | ................ | B60N 2/2362 |
| | | | | 297/367 P |
| 8,042,872 B2* | 10/2011 | Kim | ................ | B60N 2/236 |
| | | | | 297/367 L |
| 8,602,498 B2* | 12/2013 | Yamada | ................ | B60N 2/236 |
| | | | | 297/367 L |
| 8,651,578 B2* | 2/2014 | Yamada | ................ | B60N 2/236 |
| | | | | 297/367 P |
| 9,199,557 B2* | 12/2015 | Lu | ................ | B60N 2/236 |
| 10,391,895 B2* | 8/2019 | Lee | ................ | B60N 2/236 |
| 2003/0230923 A1* | 12/2003 | Uramichi | ................ | B60N 2/236 |
| | | | | 297/367 R |
| 2007/0102982 A1* | 5/2007 | Yamada | ................ | B60N 2/236 |
| | | | | 297/367 R |
| 2007/0108825 A1* | 5/2007 | Yamada | ................ | B60N 2/236 |
| | | | | 297/367 R |
| 2008/0174163 A1* | 7/2008 | Kojima | ................ | B60N 2/236 |
| | | | | 297/367 R |
| 2009/0140565 A1* | 6/2009 | Wahls | ................ | B60N 2/236 |
| | | | | 297/369 |
| 2011/0018325 A1* | 1/2011 | Yamada | ................ | B60N 2/236 |
| | | | | 297/367 R |
| 2012/0139319 A1* | 6/2012 | Fujishiro | ................ | B60N 2/236 |
| | | | | 297/366 |
| 2014/0125096 A1* | 5/2014 | Barzen | ................ | B60N 2/2356 |
| | | | | 297/354.12 X |
| 2014/0125105 A1* | 5/2014 | Yamada | ................ | B60N 2/236 |
| | | | | 297/354.12 |
| 2014/0225409 A1* | 8/2014 | Nagura | ................ | B60N 2/236 |
| | | | | 297/354.1 |
| 2014/0284984 A1* | 9/2014 | Yamada | ................ | B60N 2/236 |
| | | | | 297/366 |
| 2015/0239371 A1* | 8/2015 | Nagura | ................ | B60N 2/236 |
| | | | | 297/366 |
| 2017/0253151 A1* | 9/2017 | Maeda | ................ | B60N 2/20 |
| 2017/0334321 A1* | 11/2017 | Suzuki | ................ | B60N 2/2362 |
| 2017/0361736 A1* | 12/2017 | Chang | ................ | B60N 2/2362 |
| 2019/0193603 A1* | 6/2019 | Chang | ................ | B60N 2/236 |

* cited by examiner

SEAT RECLINER FOR VEHICLE AND METHOD OF MANUFACTURING THE SAME

CROSS REFERENCE TO RELATED APPLICATION

This application claims priority to and the benefit of Korean Patent Application No. 10-2017-0180235, filed on Dec. 26, 2017, the entire contents of which are incorporated herein by reference.

FIELD

The present disclosure relates to a seat recliner for a vehicle and a method of manufacturing the same.

BACKGROUND

The statements in this section merely provide background information related to the present disclosure and may not constitute prior art.

A recliner is provided between a seat cushion and a seat back of a vehicle to release a lock for reclining the seat back when necessary, and to lock the seat back after the reclining to maintain a desired angle.

Generally, the recliner is configured such that a fixing flange is fixed, a rotating flange is relatively rotated, and a locking gear is provided therein, whereby when the locking gear is engaged with the rotating flange, the locking is performed, and when the locking gear is disengaged therefrom, the rotating flange is relatively rotated on the fixing flange, such that the seat back is reclined with respect to the seat cushion.

A rotary cam is provided at the center of the recliner and presses a locking gear to engage therewith when the rotary cam rotates. We have discovered that since directions of configurations of a left seat and a right seat are opposite to each other, a shape of the rotary cam for each seat is required to be manufactured and assembled differently. Accordingly, same functional parts are manufactured in two shapes and thus manufacturing cost is increased due to the necessity of division when assembling the parts.

In addition, we have also discovered that if a contact surface between the rotary cam, which rotates on the fixing flange, and the fixing flange is not precisely machined, friction noise occurs, and it is difficult to provide a smooth operation of the seat recliner, and the seat recliner is easily worn, thereby decreasing the durability of the seat recliner.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a seat recliner for a vehicle and a method of manufacturing the same. In particular, the seat recliner has a rotary cam that a left seat and a right seat share and thus reduces manufacturing cost and facilitate an assembling process, and accomplish a smooth operation of the seat recliner, whereby the seat recliner operates excellently.

The present disclosure provides a seat recliner for a vehicle, and the seat recliner may include: a fixing flange provided with multiple guide parts spaced apart from each other and having a guide groove formed along a locus having a predetermined distance from a center axis of the fixing flange; and a rotary cam mounted on a center portion of the fixing flange, and configured to rotate about the center axis and press a locking gear such that the locking gear slides along the multiple guide parts. In particular, with the rotary cam includes: at least one first protrusion formed on a mount surface of the rotary cam, where the mount surface is coming into contact with the fixing flange when mounted; and at least one second protrusion formed on a surface opposite to the mount surface, and configured to engage with a control plate. The at least one first protrusion is inserted into the guide groove such that the guide groove guides a rotation of the rotary cam.

The fixing flange may include a through hole, through which a cap passes, at the center portion of the fixing flange, and the guide groove may be formed at a position spaced a predetermined distance apart from the outside of the through hole.

The guide groove may be circular.

A depth of the guide groove may be configured to be less than a protrusion height of the at least one first protrusion such that the rotary cam is mounted on the fixing flange while a predetermined gap is maintained between the mount surface and the fixing flange.

The guide groove may be filled with a lubricant.

The at least one first protrusion may be provided as a pair of first protrusions formed on the mount surface and arranged at positions symmetrical to each other with respect to the center of the rotary cam.

The at least one second protrusion may be provided as a pair of second protrusions formed on the surface opposite to the mount surface and arranged at positions symmetrical to each other with respect to the center of the rotary cam.

The first protrusion and the second protrusion may be respectively provided on the mount surface and the surface opposite to the mount surface, and arranged at positions facing each other with respect to a center line passing through the center of the rotary cam.

The first protrusion may be formed to protrude from the mount surface by a half-piercing method, or the second protrusion may be formed to protrude from the surface opposite to the mount surface by the same manner.

The rotary cam may be installed on both a left seat and a right seat of a vehicle, and each rotary cam installed on the left seat and the right seat may have the mount surface and the surface opposite to the mount surface.

A method of manufacturing the seat recliner for a vehicle includes: placing the rotary cam on a lower mold and pressurizing the rotary cam with an upper mold to mold the first protrusion on the mount surface by a half-piercing method; and turning the rotary cam formed with the first protrusion over to place on the lower mold, and pressurizing the rotary cam with the upper mold to mold the second protrusion on the opposite surface by the half-piercing method.

According to a seat recliner for a vehicle of the present disclosure, a left seat and a right seat of the seat recliner share a rotary cam to reduce manufacturing cost and facilitate an assembling process, and accomplish a smooth operation of the seat recliner, whereby the seat recliner operates excellently.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
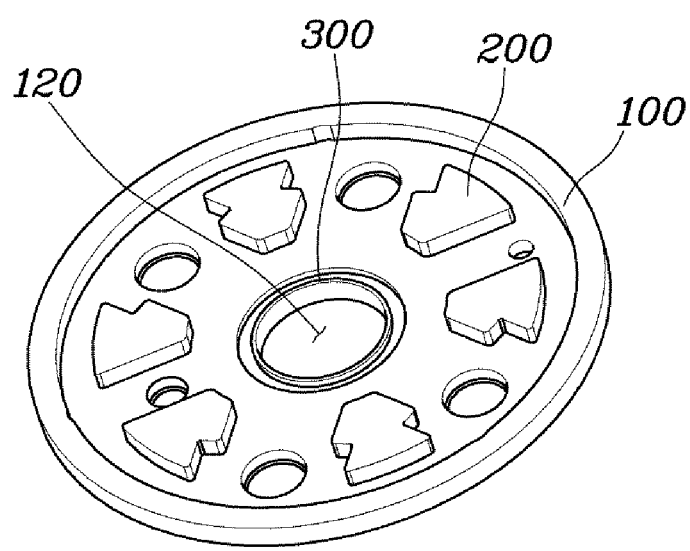
FIG. 1 is a perspective view illustrating a fixing flange of a seat recliner for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
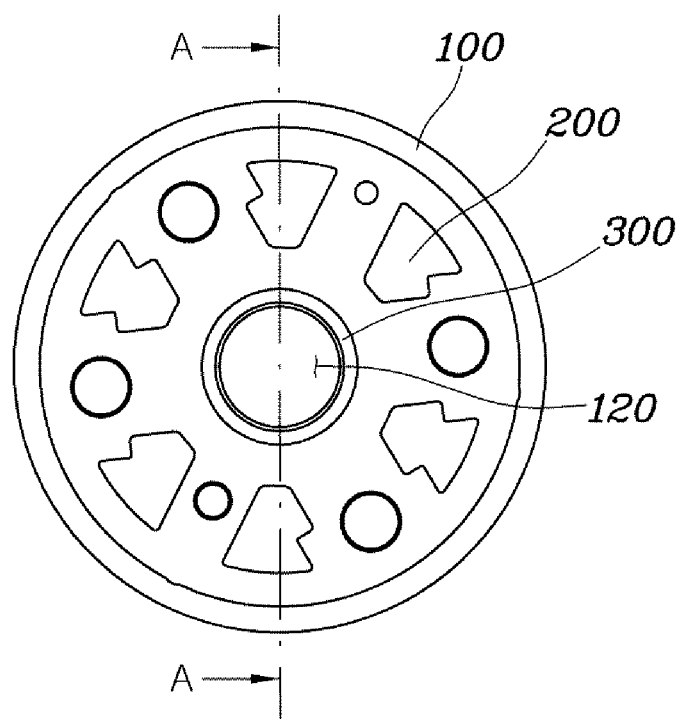
FIG. 2 is a front view illustrating the fixing flange of the seat recliner for a vehicle according to the form of the present disclosure.
Figure 3:
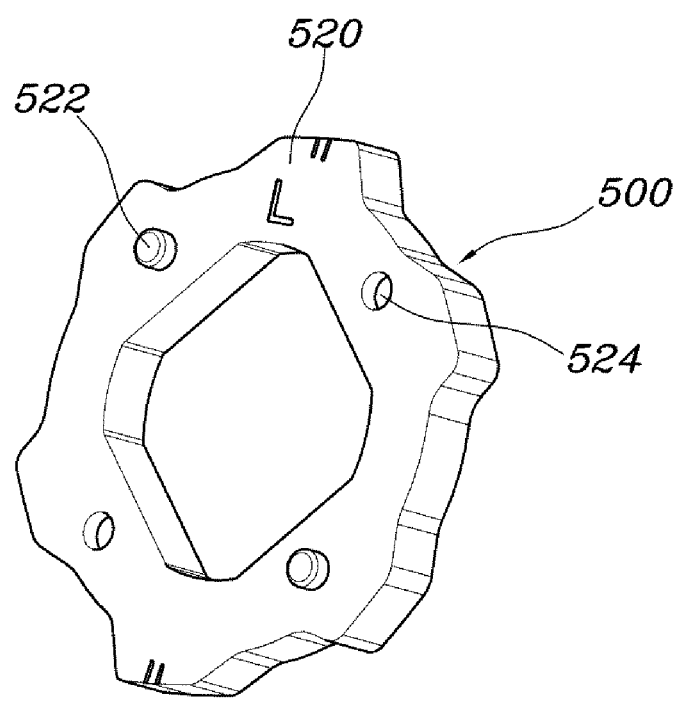
FIGS. 3 and 4 are perspective views each illustrating the rotary cam of the seat recliner for a vehicle according to the form of the present disclosure.
Figure 4:
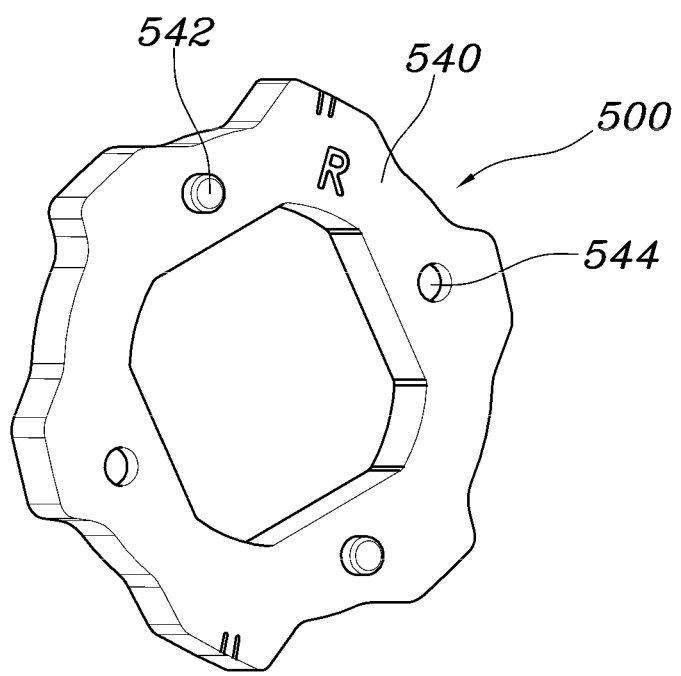
Figure 5:
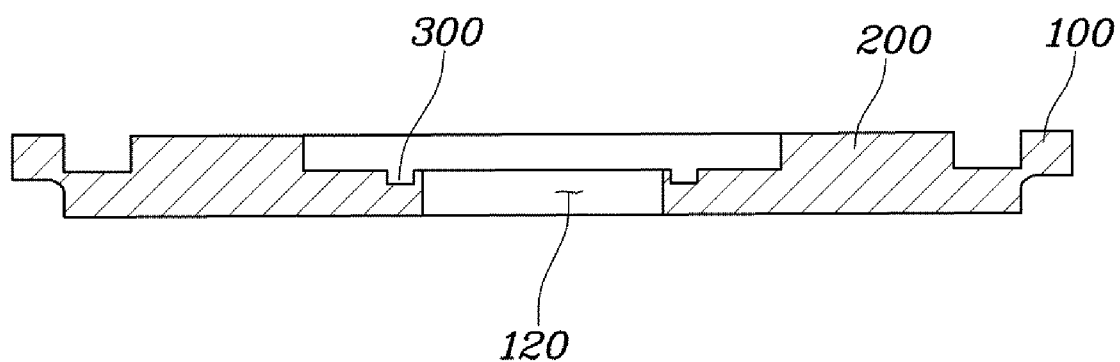
FIG. 5 is a cross-sectional view taken along A-A line in FIG. 2, illustrating the fixing flange of the seat recliner for a vehicle.
Figure 6:
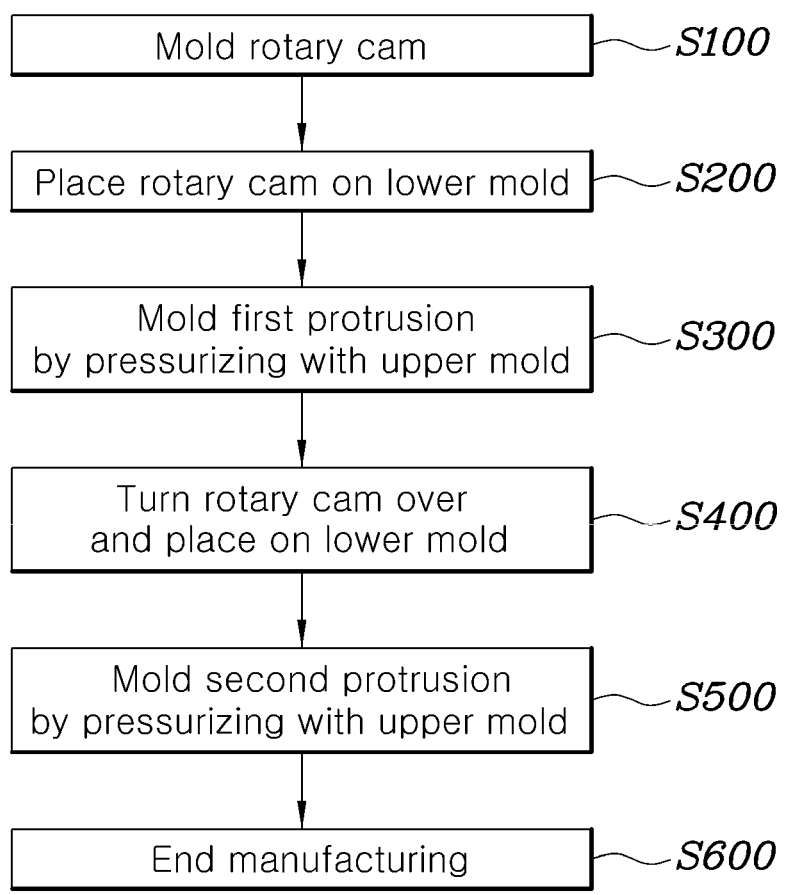
FIG. 6 is a flowchart illustrating a method of manufacturing the seat recliner for a vehicle according to an form of the present disclosure.
Figure 7:
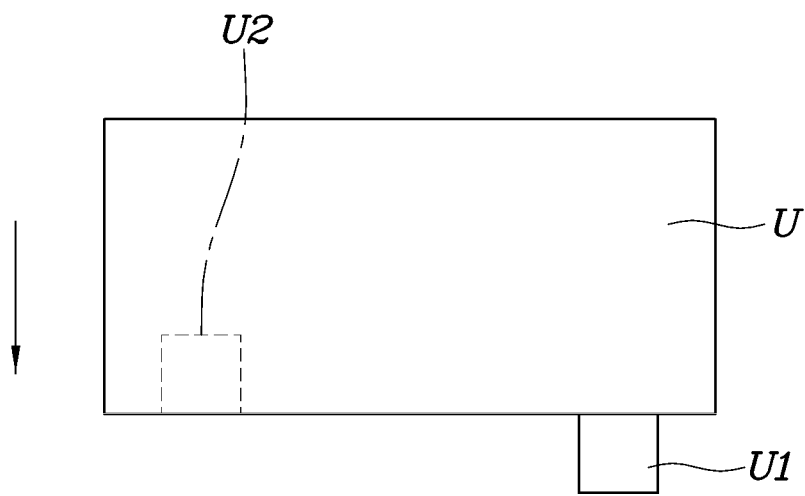
FIG. 7 is a diagram illustrating molds for manufacturing the seat recliner for a vehicle according to one form of the present disclosure.
Figure 7:
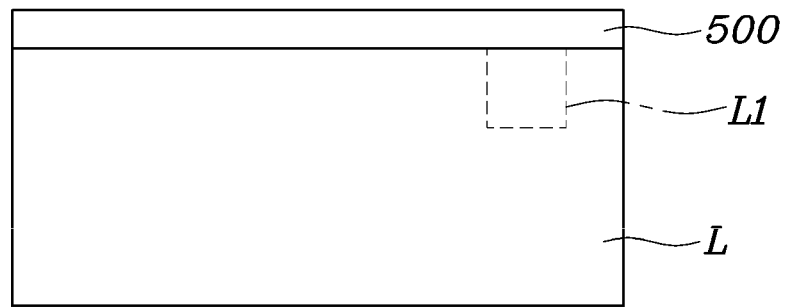

FIG. 1 is a perspective view illustrating a fixing flange of a seat recliner for a vehicle according to an exemplary form of the present disclosure; FIG. 2 is a front view illustrating the fixing flange of the seat recliner for a vehicle according to the form of the present disclosure; FIGS. 3 and 4 are perspective views each illustrating the rotary cam of the seat recliner for a vehicle according to the form of the present disclosure; FIG. 5 is a cross-sectional view taken along A-A line in FIG. 2, illustrating the fixing flange of the seat recliner for a vehicle; FIG. 6 is a flowchart illustrating a method of manufacturing the seat recliner for a vehicle according to one form of the present disclosure; FIG. 7 is a diagram illustrating molds for manufacturing the seat recliner for a vehicle according to one exemplary form of the present disclosure; and FIG. 8 is an exploded perspective view illustrating the seat recliner for a vehicle according to one form of the present disclosure.

Referring to FIGS. 1-4, the seat recliner for a vehicle includes: a fixing flange 100 provided with multiple guide parts 200 spaced apart from each other and having a guide groove 300 formed along a locus having a predetermined distance from a center axis; and a rotary cam 500 mounted on a center portion of the fixing flange 100, rotating about the center axis to press a locking gear 400 such that the locking gear 400 slides along the guide parts 200, provided with a first protrusion 522 on a mount surface 520 of the rotary cam 500, which is a surface coming into contact with the fixing flange 100 when mounted, the first protrusion 522 being inserted into the guide groove 300 such that the guide groove 300 guides a rotation of the rotary cam, and provided with a second protrusion 542 on a surface 540 opposite to the mount surface 520, the second protrusion 542 engaging with a control plate 600.

Figure 8:
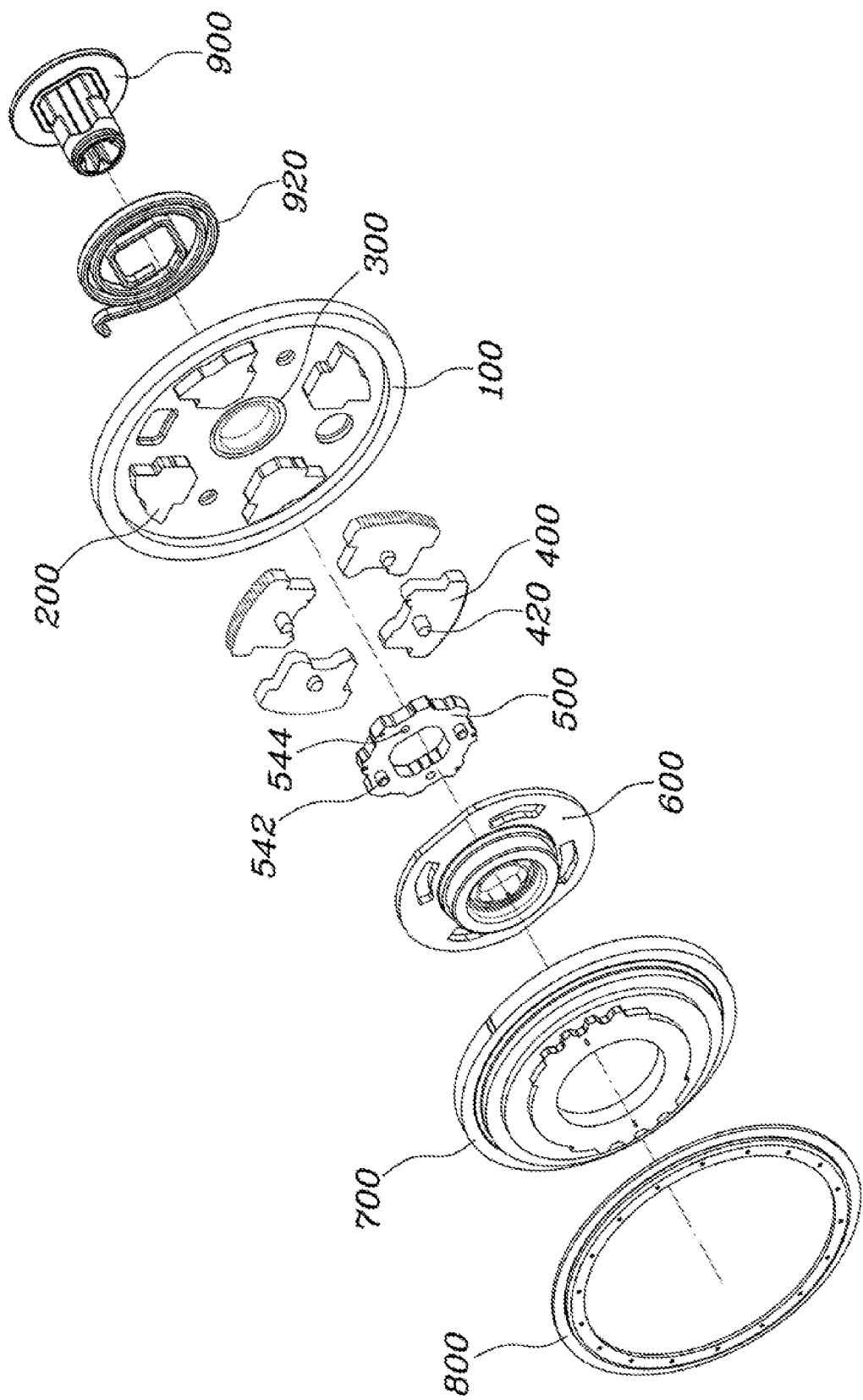
FIG. 8 is an exploded perspective view illustrating the seat recliner for a vehicle according to one form of the present disclosure.

FIG. 8 is an exploded perspective view illustrating the seat recliner for a vehicle according to one form of the present disclosure. As shown in FIG. 8, the seat recliner for a vehicle is provided with the multiple guide parts 200 on the fixing flange 100 in a manner to be spaced apart from each other. The locking gear 400 is mounted on the guide parts 200 to move forward and backward. When the locking gear 400 moves forward, the locking gear 400 is engaged with the rotating flange 700 engaged with the fixing flange 100. A rotation of a seat cushion and a seat back is held and maintains a reclined angle when engaging the rotating flange 700 with the locking gear 400.

Therefore, the rotary cam 500 for moving the lock gear 400 forward is always pressed by the spring 920 to press the locking gear 400 in a direction of moving the lock gear 400 forward. In addition, the locking gear 400 is engaged with the control plate 600 through a protrusion 420. Thus, when a user or an operation of a motor rotates the rotary cam 500, the control plate 600 also rotates such that the locking gear 400 moves backward, leading to disengagement, whereby the angle of the seat back and the seat cushion can be changed. A retainer allows the fixing flange 100 and the rotating flange 700 to maintain the engagement therebetween while the fixing flange 100 and the rotating flange 700 are rotated relatively to each other, and a cap 900 is engaged with the retainer to secure the engagement.

Specifically, as shown in FIGS. 1 and 2, the guide flange 100 is provided with the multiple guide parts 200 spaced apart from each other and has the guide groove 300 formed along a locus having a predetermined distance from the center axis.

The rotary cam, as illustrated in FIGS. 3 and 4, is mounted on the center portion of the fixing flange 100 and rotates about the center axis to press the locking gear 400 such that the locking gear 400 slides along the guide parts 200.

In addition, as shown in FIG. 3, the rotary cam 500 is provided with the first protrusion 522 on the mount surface 520, which is the surface coming into contact with the fixing flange 100 when mounted, the first protrusion 522 being inserted into the guide groove 300 such that the guide groove 300 guides a rotation of the rotary cam; and, as shown in FIG. 4, the second protrusion 542 provided on the surface 540 opposite to the mount surface 520 and engaging with the control plate 600.

Specifically, the fixing flange 100 may be configured with a through hole 120 through which the cap passes, at the center portion thereof. The guide groove 300 may be formed at a position spaced a predetermined distance apart from the outside of the through hole 120. The guide groove 300 may be formed in various shapes such as a fan-shaped arc, and in other form, the guide groove 300 may be circular. The guide groove 300 may be filled with a lubricant. Since the guide groove 300 is filled with the lubricant, the first projection 522 of the rotary cam 500, which is inserted into the guide groove 300 and slides, smoothly slides when the rotary cam 500 rotates. Since the guide groove 300 is circular, even if the filled lubricant is washed out by the first protrusion 522, the lubricant rotates on and is returned through the guide groove 300 whereby the lubricant is prevented from being lost in the guide groove 300.

A depth of the guide groove 300 is configured to be shallower than a protrusion height of the first protrusion 522 such that the rotary cam 500 is mounted on the fixing flange 100 while a predetermined gap is kept between the mount surface 520 and the fixing flange 100. That is, the rotary cam 500 is mounted on the fixing flange 100 and the first protrusion 522 of the rotary cam 500 is inserted into the guide groove 300. In this state, it is important that the fixing flange 100 and the rotary cam 500 are not surface-mounted even if the fixing flange 100 and the mount surface 520 of the rotary cam 500 are spaced apart from each other with a slight gap. Accordingly, it is possible to reduce or prevent abrasion between the rotary cam 500 and the fixing flange 100 and accomplish smooth rotation, whereby the seat recliner operates excellently. That is, with respect to the rotary cam 500, the mount surface 520 is not directly supported by the fixing flange 100 but is supported by the fixing flange 100 through the first projection 522.

As shown in FIG. 3, the first protrusions 522 of the rotary cam 500 may be provided as a pair at positions symmetrical with respect to the center of the rotary cam 500 on the mount surface 520. In the same manner, as shown in FIG. 4, the second protrusions 542 may be provided as a pair at positions symmetrical with respect to the center of the rotary cam 500 on the surface 540 opposite to the mount surface 520.

In particular, the first protrusion 522 and the second protrusion 542 may be respectively provided on the mount surface 520 and the surface 540 opposite to the mount surface 520, at positions facing each other with respect to the center line passing through the center of the rotary cam 500. In detail, FIG. 3 illustrates the mount surface 520 and FIG. 4 illustrates the surface 540 opposite to the mount surface 520, in which an "L sign" and an "R sign" are carved on the mount surface 520 and the surface 540, respectively. Those are carvings indicating that each rotary cam is assembled to the left seat and the right seat, respectively. It is possible to use the same rotary cam 500 for both the left seat and the right seat by simply setting the rotary cam 500 in the upside down position.

That is, it is possible to install the rotary cam 500 on both the left seat and the right seat of a vehicle, and each rotary cam 500 installed on the left seat and the right seat may have opposite mount surface 520 and surface 540 opposite to the mount surface 520. When using the rotary cam 500 in the left seat, the first protrusion 522 of the mount surface 520 of FIG. 3 is inserted into the guide groove 300 and the second protrusion 542 of the surface 540 of FIG. 4 is fitted in the control plate 600.

Conversely, when using the rotary cam 500 in the right seat, the case of FIG. 3 is the surface opposite to the mount surface and serves as the second protrusion, and the case of FIG. 4 is the mount surface and serves as the first protrusion. This can reduce the cost of parts, facilitate assembling of the parts in the assembly process, and easily avoid or prevent misplacement of the parts.

The first protrusion 522 may be formed to protrude from the mount surface 520 by a half-piercing method using the mold of FIG. 7, or the second protrusion 542 may be formed to protrude from the surface 540 opposite to the mount surface 520 by the same manner.

FIG. 6 is a flowchart illustrating a method of manufacturing the seat recliner for a vehicle according to an exemplary form of the present disclosure. The method of manufacturing the seat recliner for a vehicle includes: placing the rotary cam on a lower mold and pressurizing the rotary cam with an upper mold to mold the first protrusion on the mount surface by a half-piercing method; and turning the rotary cam formed with the first protrusion over to place on the lower mold, and pressurizing the rotary cam with the upper mold to mold the second protrusion on the opposite surface by the half-piercing method.

First, a plate-shaped rotary cam is molded (S100). Then, the plate-shaped rotary cam is placed on a lower mold of FIG. 7 (S200). A recess L1 is formed in the lower mold L as shown. An upper mold U is pressed down so that a protrusion U1 of the upper mold U presses the rotary cam 500 only to a predetermined depth, whereby the rotary cam 500 is configured with the first protrusion 522 in a recess L1 of the lower mold L. The half-piercing process is a technique of forming protrusions and recesses by pressing with a metal protrusion halfway, not forming a complete hole.

Thereafter, the rotary cam 500 is turned over and pressurized with the upper mold U to form the second protrusion 542 on the surface 540 opposite to the mount surface 520. In this case, the first protrusion 522 formed first is inserted into a recess U2 of the upper mold U to prevent damage of the shape thereof. As a result, the surfaces of the rotary cam 500 are symmetrical to each other as shown in FIGS. 3 and 4. In addition, the first protrusion 522 and the second protrusion 542, and corresponding recesses 524 and 544 are formed at the opposite positions, respectively.

Therefore, according to the manufacturing method, it is possible to manufacture a rotary cam of the present disclosure with only one shape of a mold, which is cost effective, easy to manufacture, and quick because there is no need to change the mold.

Although the specific forms of the present disclosure have been described with reference to the accompanying drawings, those skilled in the art will appreciate that various modifications, additions and substitutions are possible, without departing from the scope and spirit of the present disclosure.

What is claimed is:

1. A seat recliner for a vehicle, the seat recliner comprising:
   a fixing flange provided with multiple guide parts spaced apart from each other and having a guide groove formed along a locus having a predetermined distance from a center axis of the fixing flange; and
   a rotary cam mounted on a center portion of the fixing flange, and configured to rotate about the center axis and press a locking gear such that the locking gear slides along the multiple guide parts,
   wherein the rotary cam includes:
      at least one first protrusion formed on a mount surface of the rotary cam, the mount surface coming into contact with the fixing flange when mounted, and
      at least one second protrusion formed on a surface opposite to the mount surface, and configured to engage with a control plate, and
   wherein:
      the at least one first protrusion is inserted into the guide groove such that the guide groove guides a rotation of the rotary cam,
      the fixing flange includes a through hole, through which a cap passes, at the center portion of the fixing flange, and
      the guide groove is formed as a recess on a surface of the fixing flange at a position spaced a predetermined distance apart from the through hole in an outward radial direction.

2. The seat recliner of claim 1, wherein the guide groove is circular.

3. The seat recliner of claim 1, wherein a depth of the guide groove is less than a protrusion height of the at least one first protrusion such that the rotary cam is mounted on the fixing flange while a predetermined gap is maintained between the mount surface and the fixing flange.

4. The seat recliner of claim 1, wherein the guide groove is filled with a lubricant.

5. The seat recliner of claim 1, wherein the at least one first protrusion includes a pair of first protrusions formed on the mount surface and arranged at positions symmetrical to each other with respect to a center of the rotary cam.

6. The seat recliner of claim 1, wherein the at least one second protrusion includes a pair of second protrusions formed on the surface opposite to the mount surface and arranged at positions symmetrical to each other with respect to a center of the rotary cam.

7. The seat recliner of claim 1, wherein the at least one first protrusion and the at least one second protrusion are respectively provided on the mount surface and the surface opposite to the mount surface, and arranged at positions facing each other with respect to a center line passing through a center of the rotary cam.

8. The seat recliner of claim 1, wherein the at least one first protrusion is formed to protrude from the mount surface by a half-piercing method, or the at least one second protrusion is formed to protrude from the surface, which is opposite to the mount surface, by the half-piercing method.

9. The seat recliner of claim 1, wherein the rotary cam is installed on both a left seat and a right seat of the vehicle, and each rotary cam installed on the left seat and the right seat has the mount surface and the surface opposite to the mount surface.

\* \* \* \* \*